United States Patent [19]

Wraight et al.

[11] Patent Number: 4,879,463
[45] Date of Patent: Nov. 7, 1989

[54] METHOD AND APPARATUS FOR SUBSURFACE FORMATION EVALUATION

[75] Inventors: Peter D. Wraight, Missouri City; Edouard Marienbach, Houston; Jean-Michel Hache, Sugar Land; Erik Rhein-Knudsen; Mike Evans, both of Missouri City, all of Tex.

[73] Assignee: Schlumberger Technology Corporation, Houston, Tex.

[21] Appl. No.: 132,494

[22] Filed: Dec. 14, 1987

[51] Int. Cl.$^4$ .............................................. G01V 5/00
[52] U.S. Cl. ..................................................... 250/270
[58] Field of Search ............... 250/254, 262, 264, 265, 250/266, 269, 270

[56] References Cited

U.S. PATENT DOCUMENTS

| | | |
|---|---|---|
| 2,986,639 | 5/1961 | Josendal et al. |
| 3,071,689 | 1/1963 | Scherbatskoy . |
| 3,255,353 | 6/1966 | Scherbatskoy . |
| 3,321,625 | 5/1967 | Wahl . |
| 3,321,627 | 5/1967 | Tittle . |
| 3,521,065 | 7/1970 | Locke . |
| 4,006,777 | 2/1977 | LaBauve . |
| 4,048,495 | 9/1977 | Ellis . |
| 4,412,130 | 10/1983 | Winters . |
| 4,468,762 | 8/1984 | Jurgens . |
| 4,492,865 | 1/1985 | Murphy et al. |
| 4,520,468 | 5/1985 | Scherbatskoy . |
| 4,550,392 | 10/1985 | Mumby . |
| 4,596,926 | 6/1986 | Coope . |
| 4,698,501 | 10/1987 | Paske . |
| 4,705,944 | 11/1987 | Coope . |
| 4,810,459 | 3/1989 | Fontenot ............................ 250/254 |
| 4,814,609 | 3/1989 | Wraight et al. ..................... 250/254 |

FOREIGN PATENT DOCUMENTS 2175085 11/1986 United Kingdom .
2183831 6/1987 United Kingdom .

OTHER PUBLICATIONS

Koopersmith & Barnett, "Environmental Parameters Affecting Neutron Porosity, Gamma Ray, and Resistivity Measurements Made While Drilling" SPE 16758, Sep. 1987.
Paske, Roesler, Barnett & Rodney, "Formation Density Logging While Drilling," SPE 16756, Sep. 1987.
Roesler, Barnett & Paske, "Theory & Application of a Measurement-While-Drilling Neutron Porosity Sensor," SPE/IADC 16057, Mar. 1987.

Primary Examiner—Janice A. Howell
Assistant Examiner—T. Nguyen
Attorney, Agent, or Firm—Stephen L. Borst

[57] ABSTRACT

A measurement while drilling nuclear tool adapted to be coupled in the drill string to make formation evaluations and methods of using are described. A neutron source is positioned on the cylindrical axis of the tool while a connected gamma ray source is eccentered against an interior side of the cylindrical tool. Both sources can be axially removed from the tool along its interior. Novel source-detector configurations are provided in order to accommodate the constraints of the MWD environment. Gamma ray transparent windows are provided through both the drill collar and an external fluid excluder (stabilizer) at the positions of the gamma ray source and scintillator detectors. Neutron detectors may be of two different types at the same spacing from the source. Corrections are made for microphonic noise that arises while drilling and for natural gamma ray background. A drilling fluid density determination is made and is utilized to compensate for "borehole" or "standoff" effects.

46 Claims, 3 Drawing Sheets

METHOD AND APPARATUS FOR SUBSURFACE FORMATION EVALUATION

BACKGROUND

In the search for subsurface hydrocarbons, once a borehole has been drilled, it is nearly always necessary to perform an evaluation of the properties of the rock formation in which the borehole has been formed. The most common purpose for performing such an evaluation is to determine the water saturation and porosity of a porous formation. This information is clearly essential in order to properly evaluate the economics of converting the open borehole into a producing well and in order to develop a plan for producing the hydrocarbon fluids from the hydrocarbon bearing formations if the economic evaluation is favorable.

The technique that has achieved greatest acceptance in the oil industry for determining water saturation and porosity is that which has become to be known in the industry as wireline logging. The vast majority of the wells which are evaluated by wireline conveyed instruments in order to determine water saturation and porosity are logged by a suite of logs commonly referred to as the triple combo. The triple combo ordinarily includes three wireline logs including a resistivity log (either an electrical current measurement or an electrical induction measurement) for measuring formation resistivity, a neutron measurement for measuring formation porosity, and a gamma ray measurement for measuring formation density. In addition, sometimes the triple combo will include a sonic log.

While the results that are derived from wireline techniques for the most part are satisfactory, it is becoming increasingly recognized by those skilled in the art that there may be advantages to be derived from non-wireline techniques. Unfortunately, wireline logging must be performed after the formation of the borehole is complete. Thus, wireline logging may occur hours or even days after the borehole has been formed. As a result, the formation and the borehole may change with time so that the results to be obtained by the wireline investigations may be less than optimal and the formation properties of greatest interest may be obscured.

For example, the electrical properties of the formation may change over time as the drilling fluid seeps into or invades the formation. It is known that as the process of invasion occurs, the drilling fluid separates into a filtrate which penetrates the formation and a filtercake formed of the solids in the drilling fluid, which coats the surface of the borehole. The invasion modifies the readings obtainable by, for example the resistivity tool, while the filtercake makes it difficult for a wireline instrument to be placed directly against the rock so that a tool "standoff" condition results. "Standoff" has an adverse effect on many wireline instruments including the neutron porosity instrument.

Another adverse effect that may occur over time is that the formation itself may change. The formation material may swell when exposed to the drilling fluid thereby closing off the borehole. On occasion the formation matrix may be so insubstantial as to sluff off or collapse into the borehole to create a "cave" which poses standoff difficulties for many of the wireline investigations. If the tendency of the formation material to collapse into the borehole is extreme, the borehole itself may collapse or bridge over which not only may prevent further wireline logging, but also may result in lost tools and/or a lost well.

Additionally, the time required to complete the wireline investigation delays the process of converting the borehole into a producing well at significant expense.

It is therefore clear that if the measurements of the formation properties typically made after the completion of the borehole by the wireline technique could be performed while the well is being drilled, many of the above difficulties inherent in wireline logging would be avoided.

The satisfactory performance of formation evaluation during the course of excavating the borehole is only now becoming available to the oil industry. Previously, techniques had not been developed that satisfactorily addressed the problems inherent in formation evaluation while drilling. For example, the industry has prudently been reluctant to include a radioactive source in the drill string.

PRIOR ART

At least one prior art attempt has recently been made to provide nuclear (gamma density or neutron porosity) formation evaluation while drilling. U.S. Pat. Nos. 4,596,926, 4,698,501 and 4,705,944 and GB patent application Nos. 2,175,085 and 2,183,831 and accompanying papers have proposed an apparatus design which places the nuclear source (neutron or gamma ray) in pockets in the exterior of the drill collar. Three independent measures are provided for preventing the sources from becoming dislodged during the drilling process. These extraordinary measures are implemented since it is tacitly understood, albeit unmentioned, that the consequences of a source falling into the borehole while drilling is being performed would be totally unacceptable. While the three separate measures aid in preventing the sources from becoming lost in the well, insertion of the sources into and removing the sources from that tool is made more difficult and requires more time than is desirable The time required to perform these tasks should be kept to a minimum since the radiation exposure to the individuals performing the tasks is cumulative.

Furthermore, with the proposed apparatus of the prior art, additional difficulties are bound to arise at the earth's surface in the event that the drilling process were to damage the exterior of the drill collar in which a pocket containing a source is formed. Drill collar damage to the degree that removal of the sources from their pockets is impaired is clearly undesirable for the reasons mentioned above. Additionally, the prior art is silent on the risks posed in the event the drill string were to be lost in the bottom of the borehole and "washover" or "fishing" procedures were to be employed in order to retrieve the lost tool. It: is not inconceivable that such fishing practices might damage the source containing pocket if not the source itself.

SUMMARY

A novel configuration for a MWD nuclear logging tool has been developed which avoids the difficulties inherent in the prior attempts. In the apparatus of the present invention, both neutron and gamma ray instruments have their sources located entirely on the interior of the cylindrical drill collar and are arranged so that the sources may be inserted into and withdrawn from the instrument axially through one end of the drill collar.

Broadly, the MWD logging apparatus for investigating properties of earth formations surrounding a borehole while drilling includes a tubular body adapted to be coupled to a drill string and adapted to permit the flow of drilling fluid therethrough. A neutron source is positioned within the body on its cylindrical axis in such a manner that drilling fluid is permitted to flow therearound. The emitted neutrons produce secondary radiations in the formations as a result of neutron-formation interactions.

In this regard, the term "secondary radiation" is used to include either neutrons scattered by the formation (e.g. thermal or epithermal neutrons) or gamma rays resulting from neutron capture by nuclei of the formation.

A first group of detectors sensitive to the secondary radiation are positioned within the tubular body at a first spaced location from the source and produce a signal indicative of the detected secondary radiation. A second similar set of detectors are positioned at a second spaced location in order to permit the well known technique of borehole compensation. Such first and second sets of detectors may include thermal or epithermal neutron detectors, (e.g gas tubes of the Helium 3 or Boron trifluoride category or scintillator/photomultiplier combinations using plastic scintillators or lithium glass based scintillators) or gamma ray detectors , (e.g. G.M. tubes or scintillator/photomultiplier combinations of the sodium iodide or cesium iodide scintillator category). Each set of detectors may be arranged in a circular array with an interior central cylindrical thermal neutron shield which allows the downward flow of drilling fluid through the center of the array. The array may comprise at least two different kinds of detectors in order to maximize the information obtainable. As an example, where the two types of detectors are GM tubes (which detect capture gamma rays) and He 3 detectors (which detect scattered neutrons), signals from both sets of detectors may be combined to generate an indication of chlorine in the formation.

In the preferred embodiment the apparatus also includes a gamma ray source positioned against the interior side of the tubular body at an axial position different from the position of the neutron source. In its eccentered location, the drilling fluids moving down the interior of the tool are permitted to flow only on the side of the source away from the formation The neutron and gamma ray sources are preferably connected one to the other, with the neutron source above the gamma ray source, by a flexible cable having a grappling head on its upper end so that the connected sources may be simultaneously removed from the tool along its interior passage.

First and second gamma ray detector systems, either scintillation crystals coupled to photomultiplier tubes or GM tubes, are positioned at different spacings from the gamma ray source. These detectors are also eccentered against the interior side of the interior passage of the tubular body so that the downwardly moving drilling fluid can only pass on the side away from the formation. Since the gamma ray source and detectors are on the interior of the tubular body of the tool, gamma ray backshielding may be provided behind the detectors while gamma ray transparent windows are provided through the body to permit the exit and return of the gamma rays. A fluid excluding means or a stabilizer blade may be externally positioned adjacent the positions of the windows and may also be provided with similar windows. In this manner the source and detector are collimated so as to significantly enhance vertical and circumferential resolution as the drill collar rotates during the drilling process. Means may then be provided for generating a signal as a function of angular position by detecting such rotational position and recording the detected data accordingly.

In response to the signals generated by the above described detectors, the apparatus generates depth dependent values commonly known in the industry as neutron porosity and gamma density logs. However, prior to generating these valuable output products, it has been found to be expedient to take additional measures that permit the formulation of corrections for improving the measurements. For example, since the measurements can be significantly affected by the presence of drilling fluid between the apparatus and the formation, a measure of the density of the drilling fluid is derived from a gamma ray detector positioned to detect gamma rays traversing the downwardly flowing drilling fluid on the interior of the apparatus. Also, a means is provided for detecting the natural activity of the formation so that this background may be removed from the signal detected by the gamma ray detectors.

In addition to the above two improvements, it has been found desirable to perform a third correction. During the drilling process, the drill collar may experience significant accelerations which generate microphonic noise in the neutron detector systems. This noise is clearly unrelated to the characteristics of the formation so it only serves to obscure the measurements. Therefore, means are provided for detecting and removing the microphonic noise component from the data. In the preferred embodiment, this is performed by including an accelerometer which is used to detect occurrences of high acceleration so that the corresponding noisy data may be discarded. Alternatively, an extra, passive, helium 3 detector which does not have the usual high voltage applied to its central conductor or is lacking the helium gas may be provided. In this manner, the passive detector would not respond to neutrons as would a conventional detector but it would still generate microphonic noise in response to high accelerations The signal from this detector therefore may be used as a microphonics indicator for making corrections to the outputs of the active helium 3 detectors. A still further alternative is to provide an active He 3 detector which is either far enough away from the neutron source or shielded so that one would not expect it to be exposed to a significant neutron flux. Any signal originating from such a "control" detector can be attributed to microphonic noise.

An additional measure to further desensitize the standard helium-3 detector system to microphonics is to reverse the polarity on the He 3 tubes so that the collector is at zero or ground potential which permits the elimination of the traditional voltage standoff capacitors which are one of the sources of the noise. In this embodiment, extra measures then have to be implemented to electrically insulate the exterior of the helium 3 detectors since the housings are now at high voltage.

As is well known, a neutron source causes nuclear activation which produces gamma rays upon subsequent radioactive decay. Where a neutron logging source is close to a gamma ray detector, the detected signal will then at least in part be due to gamma rays from the neutron activation of the drill collar. Thus, a technique is desirable for determining the amount of activation signal component contained in the total gamma ray signal which carries other useful formation information. If the activation component can be determined, subsequent compensation of the gamma ray signal for this activation component may be performed.

BRIEF DESCRIPTION OF THE DRAWINGS

The novel features of the present invention are set forth with particularity in the appended claims. The invention, together with further objects and advantages thereof, may be best understood by way of the following description of an exemplary embodiment of apparatus employing the principles of the invention as illustrated in the accompanying drawings, in which:

DETAILED DESCRIPTION

Figure 1:
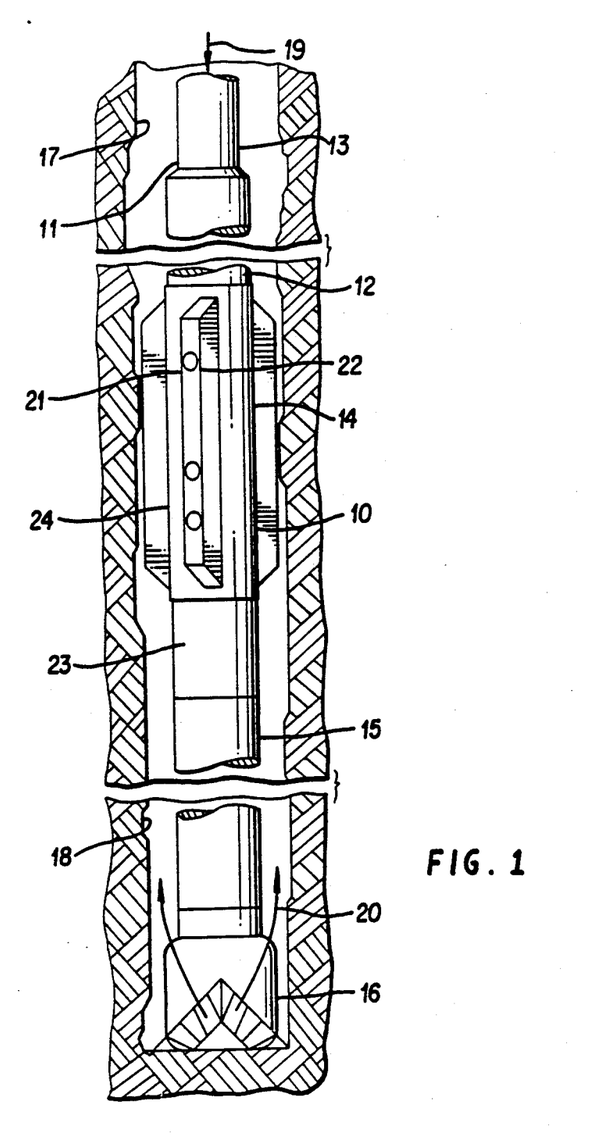
FIG. 1 shows a preferred embodiment of an MWD apparatus of the invention coupled in a drill string.

Turning now to FIG. 1, a preferred embodiment of a new and improved logging apparatus 10 arranged in accordance with the principles of the present invention is illustrated. The apparatus 10 is shown dependently coupled to the lower end of a drill string 11 of tandemly connected drill pipe joints as at 13. As depicted, the apparatus 10 includes a tubular body 14 which is coupled to the upper end of a tool body 15 that is in turn coupled to earth-boring means such as a fluid-powered turbodrill or a drill bit 16 adapted for progressively excavating a borehole 17 through various subterranean earth formations as at 18. As is customary, once the drill bit 16 has reached the bottom of the borehole, the drill string 11 is rotated by a typical drilling rig (not shown) at the surface while substantial volumes of a suitable fluid such as a so-called "drilling mud" are continuously pumped downwardly through the drill string (as shown by the flow arrow 19). This drilling mud is discharged from multiple ports in the drill bit 16 to cool and lubricate the bit as well as to transport formation materials that have been removed by the bit to the surface as the drilling mud is returned upwardly (as shown by the arrow 20) by way of the annular space in the borehole 17 outside of the drill string 11.

In FIG. 1 it will be seen that the tubular body 14 of apparatus 10 comprising one or more drill collars 12 is preferably adapted to be tandemly coupled between the tool 15 and the lower end of the drill string 11. From FIG. 1 it will also be noted that the new and improved apparatus 10 further includes an enlarged body, as shown generally at 21, cooperatively arranged on the mid-portion of the body 14 so as to project outwardly toward at least one sidewall of the borehole 17. Although the specific materials and configuration of the enlarged body 21 are wholly incidental to the overall purposes of the invention, as a matter of convenience it has been found that a drill collar stabilizer wit two or three generally-helical blades, as at 22, which are preferably of steel or some other gamma-ray shielding material can be readily modified top provide the enlarged body. One preferred form of stabilizer preferably has a split body so that it can be quickly clamped around the tool body 14. As will be subsequently described in detail, the stabilizer 21 as modified by the present invention, is selected so that ordinarily the outer surfaces of the blades 22 will be spaced no more than about one inch from the adjacent wall surface of the borehole 17 with the ideal clearance being zero. This close spacing will significantly reduce any tendency for the lower portion of the drill string 11 to move laterally in the borehole 17. Typically, drill collar stabilizers, as at 21, provide for an adequate flow area between the stabilizer blades 22 to accommodate the upwardly-flowing stream of drilling mud 20 through the annulus of the borehole 17.

As depicted in FIG. 1, the tool 15 is preferably comprised of an assembly of thick-walled tubular bodies enclosing sensors and circuits for measuring various downhole conditions such as the condition of borehole fluids as well as selected properties or characteristics of the formations 18 that have been penetrated by the drill bit 16. As used in this application, "formation" is referred to as meaning both rock matrix and contained fluid components.

Although other means can be employed to transmit the measurements to the surface, the depicted tool 15 further includes acoustic data-signalling means 23 arranged for receiving output signals from the several measuring sensors and successively transmitting encoded signals representative of these output signals through the drilling mud in the drill string 11 to the surface where the acoustic signals are detected and processed by appropriate signal detecting-and-processing surface apparatus (not illustrated). To practice the present invention, the tool 15 as well as the surface apparatus are preferably arranged in a similar fashion as the downhole and surface apparatus that is disclosed in U.S. Pat. No. 4,479,564. As will be subsequently described in more detail, the tool 15 also includes typical radioactivity-logging means 24 arranged above the data-signalling means 23.

Figure 2A:
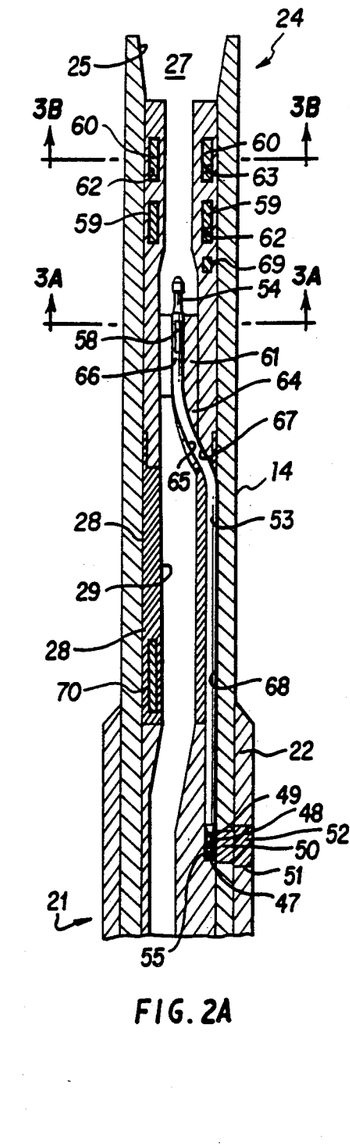
FIGS. 2A and 2B show an elevational section of the MWD apparatus shown in FIG. 1.
Figure 2B:
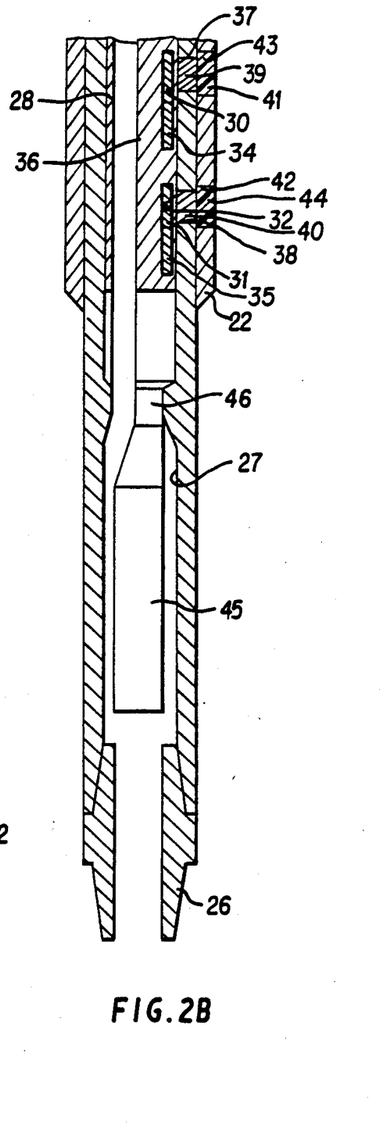

Turning now to FIG. 2, successive elevational views in cross-section are shown of a preferred embodiment of the apparatus 10 of the invention. As depicted, the body 14 has typical box and pin tool joints 25 and 26 arranged for coupling the apparatus 10 in the drill string. As depicted in the figures, an elongated cylindrical body 28 is coaxially disposed in the midportion of the longitudinal bore 27 and fluidly sealed therein in relation to the outer body 14. The inner body 28 is provided with a longitudinal flow passage 29 of an appropriate size for carrying the drilling mud flowing between the upper and lower portions of the longitudinal bore 27 through the outer body 14, with portions of this passage being laterally offset To facilitate the measurement of formation density, gamma-radiation detectors 30 and 31 of the inorganic scintillator coupled to a photomultiplier are provided and are enclosed in an elongated fluid-tight chamber 32 that is arranged within the inner body 14 to one side of the flow passage 29 and extend longitudinally along the opposite side of the cylindrical body from the flow passage. To position the detectors 30 and 31 at appropriate longitudinally-spaced intervals inside of the fluid-tight chamber 32, the detectors are respectively mounted in separate upper and lower recesses 34 and 35 formed in a suitable radiation shield 36 that is positioned so that the recesses face outwardly away from the flow passage 29. The radiation shield 36 is fashioned of one or more suitable gamma-ray shielding materials such as bismuth, lead, tungsten alloy or other materials that are substantially opaque to gamma-ray radiation.

Since the steel body 14 will otherwise limit or prevent gamma-ray energy from reaching the detectors 30 and 31, upper and lower lateral openings 37 and 38 are formed in the steel body and are respectively aligned with the gamma-ray sensitive elements of the upper and lower detectors in the chamber 32. These openings 37 and 38 are fluidly sealed by radiation-transparent members, as at 39 and 40, such as complementary plugs of beryllium that are each protected from the borehole fluids by a thin titanium sheath. To minimize the adverse effects of the mud standoff, the apparatus 10 of the invention further includes upper and lower openings 41 and 42 which are appropriately arranged in one blade 22 of the modified stabilizer 21 so that: whenever that stabilizer is properly mounted on the body 14, the openings in the blade will be laterally aligned with their associated openings 37 and 38. To exclude mudcake or other borehole materials from these opening 41 and 42, the openings in each modified blade are also respectively filled with a plug 43 and 44 of epoxy or some other radiation-transparent material.

As depicted in FIG. 2, in the preferred embodiment of the apparatus 10, at least a portion of the associated electronic circuitry of the radioactivity-logging means 24 is arranged within a fluid-tight chamber or so-called "cartridge" 45 that is mounted in the longitudinal bore 27 of the body 14 below the cylindrical body 28 and coupled thereto by a tubular extension 46 defining a conductor passage between the detector chamber 32 and the cartridge. Cartridge 45 may contain suitable solid state memory and a power supply for downhole operation independent of external telemetry and power supplies.

Referring now to FIG. 2, in the preferred embodiment of the new and improved apparatus 10 of the present invention, the upper end portion of the body 28 is cooperatively arranged for defining an upwardly-opening blind bore or radiation-source chamber 47 that is located on the same side of the cylindrical body as the detector chamber 32 and is terminated a short distance thereabove. As depicted, the source chamber 47 is also laterally offset in relation to the passage 29 and is cooperatively arranged so as to define a reduced-thickness wall portion 48 that extends longitudinally along the opposite side of the cylindrical body 28 from the internal flow passage.

Since the outer body 14 would otherwise attenuate the passage of gamma-ray energy, a lateral opening 49 is arranged in the body so as to be aligned with the enclosed source chamber 47 on the other side of the reduced-thickness wall portion 48. The opening 49 is fluidly sealed by a radiation-transparent member 50 similar or identical to the plugs 39 and 40. In order to minimize the attenuation of gamma-ray energy, a lateral opening 51 is appropriately arranged above the lateral opening 41 in the blade 22 stabilizer 21 so that whenever that stabilizer is properly mounted on the tool body 14 the opening 51 will be laterally aligned with the body opening 49. The opening 51 is filled with a radiation-transparent material 52 for excluding mudcake or other borehole materials.

Apparatus 10 also includes an elongated mandrel or retrievable body 53 having its upper end secured to an upstanding fishing neck 54 and the lower end portion of the body is appropriately sized to be received in the upwardly-opening source chamber 47. A source 55 of gamma-ray energy such as a quantity of cobalt or cesium or any other radioactive substance that produces gamma rays in its decay is mounted on the lower end of the elongated body 53 and arranged so that the source will be positioned directly behind and laterally aligned with the body opening 49 whenever the lower end portion of the body is correctly disposed within the source chamber 47. As a matter of convenience, it is preferred to employ an encapsulated chemical source such as those typically in use with wireline logging tools.

The primary function of the modified stabilizer 21 is to reduce radiation streaming from the source 55 through the borehole 17 to the detectors 30 and 31. Moreover, the stabilizer blade 22 serves to effectively displace or exclude drilling mud from that portion of the borehole annulus that is directly between the adjacent earth formations, as at 18, and the detectors 30 and 31 and the source 55. In this manner, the respective paths that the gamma-ray energy from adjacent formations must take to reach the detectors 30 and 31 as well as the path of gamma-ray energy that is emitted by the radiation source 55 will always be substantially through the formations Even though there will always be a minor amount of drilling mud and, perhaps occasionally, a thin layer of mudcake located between the outer edge of the stabilizer blade 22 and the nearby borehole wall, the modified stabilizer 21 will nevertheless enable the radioactivity-logging means 24 to obtain formation density measurements having a degree of accuracy that would not otherwise be possible without the MWD apparatus.

In addition to obtaining successive measurements that are representative of the density of the various earth formations being penetrated during a drilling operation, it is also of value to obtain successive contemporaneous measurements that are representative of the neutron porosity of those formations. Accordingly, portions of the radioactivity logging means 24 are also cooperatively arranged in the new and improved apparatus 10 for enhancing measurements representative of the neutron porosity of the earth formation Thus, as depicted in FIG. 2, for obtaining these measurements the apparatus 10 further includes a second radiation source 58 which is cooperatively associated with the radioactivity logging means 24. As was the case with the detectors 30 and 31, other elements of the logging means 24 such as one or more radiation detectors 59 and 60 are cooperatively arranged in the body 14 and spatially disposed from the radiation detectors 30 and 31 and the radiation source 58. In the preferred manner of arranging the apparatus 10, an elongated tubular extension 61 is coaxially arranged in the longitudinal bore 27 and fluidly sealed relative to the body 14 for defining upper and lower enclosed spaces 63 and 62 respectively enclosing the detectors 59 and 60.

The measurements provided by the detectors 59 and 60 will be greatly enhanced by coaxially arranging the radiation source 58 in the body 14. Not only will such a coaxial arrangement better accommodate a larger source with correspondingly greater radiation output strength such as americium beryllium, but the centralized location will also provide symmetrical output responses from the detectors 59 and 60. Alternatively the source 58 may comprise an ruggedized electronic, accelerator neutron generator of a type well known in the logging industry. As depicted, in the preferred embodiment of the apparatus 10, the radiation source 58 is mounted on the upper end portion of the elongated body 53 just below the fishing neck 54. Since it is of paramount importance that the radiation sources 55 and 58 can be readily removed from the apparatus 10, the elongated body 53 is preferably arranged as a flexible member such as a relatively stiff metal cable cooperatively intercoupling the fishing neck 54 and the radiation sources.

To correctly position the radiation sources 55 and 58 in the longitudinal bore 27, a centralizing member 64 is disposed in the extension 61 and adapted to define a central passage 66 with an upper axially-aligned portion cooperatively arranged for centering the upper end portion of the retrievable body 53 in the tool body 14. An extension 65 of the central passage 66 is further arranged with a lower downwardly-inclined portion 67 that diverts the intermediate portion of the retrievable body 53 to the side of the bore 27 so that the lower portion of the retrievable member can be loosely retained with a laterally-offset longitudinal passage 68 that extends along one side of the extension member 61 and is aligned with the source chamber 47 in the central body 28. Accordingly, it will be seen from FIG. 2 that although the two interconnected passages 66 and 68 cooperate to correctly position the sources 55 and 58 in the body 14, by virtue of the flexibility of the elongated body 53 and the curvatures of the transitional portions of the two passages, the elongated body can be readily removed from the tool body. Thus, in accord with the objects of the present invention, it will be recognized that removal of the radiation sources 55 and 58 can be selectively accomplished by lowering a suitable wireline grapple (not shown) through the drill string 11 and on into the upper end of the body 14 until the grapple is securely coupled to the upstanding fishing neck 54. Removal of the lower and upper sources 55 and 58 will be carried out without it being necessary to disconnect any electrical connections. Moreover, even though the removal of the sources 55 and 58 will render the radioactivity-logging means 24 thereafter inoperative, the tool 15 will still be functional so that it can continue to provide the other downhole measurements that are independent of either of the radiation sources 55 and 58.

So long as the radiation sources 55 and 58 are positioned within the apparatus 10 of the invention, the radioactivity logging means 24 will be operative to provide successive signals representative of the formation density and porosity of the earth formations 18 that have been penetrated by the drill bit 16. On the other hand, should the drill string 11 become stuck in a borehole, the retrievable body 53 can be readily removed from the apparatus 10 and returned to the surface as a safety precaution before any attempt is made to recover the tool. In a similar fashion, even though the retrievable body 53 will generally be left in position within the body 14 during the course of a drilling operation, it will be a simple matter to remove the retrievable body from the apparatus 10 as a precautionary matter without affecting the subsequent operation of the tool 15 for obtaining one or more measurements that are independent of radiation sources such as those shown at 55 and 58. Accordingly, should it be believed that the drill bit 16 is about to drill into a formation interval in which there is a risk that the tool may become stuck, the drilling operation can be halted long enough to allow a wireline grapple to be lowered through the drill string 11 and coupled to the fishing neck 54 on the retrievable body 53. Once the sources 55 and 58 have been safely returned to the surface, drilling of the borehole 17 may, be resumed while continuing to operate the tool 15 for measuring the other downhole conditions which do not require potentially dangerous chemical radioactive sources.

Figure 3A:
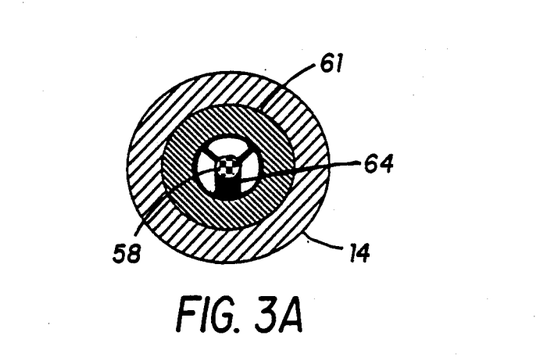
FIG. 3A and 3B show cross-sections of the neutron source and detector sections of the tool shown in FIG. 2.

Turning now to FIG. 3a, a cross-section of the tool at the location of the neutron source 58 is illustrated. As can be seen, source 58 is positioned on the axis of the tool by a support member 64. Member 64 is concentrically mounted in the center of extension member 61 and permits the downwardly flowing drilling fluid to pass generally around the source 58.

Figure 3B:
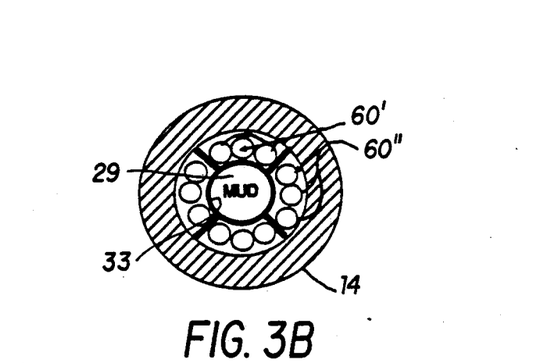

A cross-section of the tool at the position of one of the detector arrays of the neutron porosity portion of the logging means 24 is shown in FIG. 3b. While only the far spaced detector location is illustrated in FIG. 3b, it will be understood that a similar detector arrangement may be provided at the near spaced detector location also. Detector array 60 preferably consists of a total of twelve detectors of which six are of one variety and six are of another variety. Specifically, detectors 60' may comprise parallel connected helium 3 detectors which are sensitive to neutrons while detectors 60'' may comprise parallel connected Geiger-Mueller tubes which are sensitive to gamma rays produced by the interaction between thermal neutrons and the formation nuclei and the drill collar materials. In order to reduce the response of the detectors to secondary radiation emanating from events occurring in the drilling fluid within the tool, a cylindrical thermal neutron and gamma ray absorber 33 is situated on the inside of the detector array between the detectors and the downwardly flowing drilling fluid in passage 29. Absorber 33 may comprise a thin layer of cadmium or boron-10.

Detectors 60' and 60'' may be advantageously arranged in groups of three detectors of the same kind: the He 3 detector groups alternating with the GM detector groups. In this manner, at a specific moment in time, each group has greater sensitivity to the angular section of formation generally adjacent to the group. Advantage may be taken of this angular sensitivity to generate the signals from these detectors as a function of rotational angle to enable the detection of azimuthal variations in the characteristics of the formation.

Information in addition to an indication of porosity may be derived from the He-3 and GM detectors. It is known that a strong absorber of thermal neutrons, such as chlorine, will reduce the population of thermal neutrons and hence the He-3 signal while enhancing the number of capture gamma rays to thereby effect an increase of the signal from the GM tubes. Hence these two signals may be combined as an indicator of chlorine in the formation.

Inclusion of He-3 detectors in the logging means 24 is not without difficulties. Large accelerations or shocks applied to such a detector is apt to produce an interfering signal or microphonic noise. Successful implementation of a formation evaluation while drilling neutron density tool with helium three detectors requires the minimization or elimination of this interference. At least two measures are therefore proposed to address this problem. He-3 detectors are normally wired to apply a high voltage to a central conductor while the outside housing is kept at ground. Such an arrangement requires capacitors to maintain the potential difference between these two elements. Unfortunately, such capacitors are prone to the production of microphonic noise upon large accelerations. In the preferred embodiment of the present invention, it is proposed to eliminate this source of microphonic noise by inverting the normal arrangement and ground the central conductor while maintaining the housing at a highly negative voltage. This enables the elimination of the noise producing capacitors but imposes the requirement that the exterior of the He-3 tubes then be electrically shielded from the rest of the tool.

A second measure that has been implemented in the preferred embodiment is to detect the occurrence of microphonic noise so that the effected data may be discarded. A variety of methods for detecting the occurrence of such noise are proposed, the preferred method being the provision of an accelerometer 69 which is sensitive to accelerations. An acceleration level or threshold may be determined, above which unacceptable levels of microphonic noise are generated by the He-3 detectors. Such an accelerometer is desirable in that little physical space is required. While field tests will have to be performed for confirmation, it is expected that accelerations less than 100 g's will not produce interfering microphonic noise, whereas accelerations greater than 250 g's will produce microphonic noise of such a magnitude that the data will have to be disregarded.

As an alternative to an accelerometer, an actual He-3 detector may be provided, space permitting, which has a reduced potential difference placed between the central conductor and the outside housing or which has no internal helium 3 gas. Such a passive detector would not be as sensitive to neutrons but would generate a microphonic signal similar to those of the active detectors: such signal being useful for detecting the occurrence of microphonic producing accelerations and enabling the selective deletion or disregard of the data so effected. As a final physical alternative, an active He-3 detector may either be shielded or positioned such that no significant flux of neutrons are expected to be seen by the detector. Hence, the normal neutron produced output signal from such a detector would be null and an actual signal would be indicative of noise.

While physical measures for dealing with the microphonic noise have been discussed above, it may be possible to at least partially deal with the noise by using the signal from the GM detectors (which is free of such noise) as an aid in either detecting and/or eliminating the microphonic noise effects from the He-3 signal. While the GM detector sensitivity is substantially less than that of the He-3 detectors, one may nevertheless be able to identify signal events (such as spikes) in the output signals of the He-3 detectors that are lacking in the GM detector outputs and which can only be attributable to the occurrence of microphonic noise in the He-3 detectors. Thus the signal from the GM tubes may be used in a signal processing sense as a smoothing function to smooth the signal from the He-3 detectors to eliminate such noise events. This approach has the advantage that all of the data is used as opposed to disregarding the affected data where microphonics is detected.

Returning now to the vicinity of the gamma ray source 55 of the logging means 24 illustrated in FIG. 2, there may be provided an additional gamma ray detector means 70 in such a location and shielded such that substantially all of the gamma rays detected arrive at the detector means 70 only after having traversed the flow passage 29 filled with drilling fluid. Detector means 70 may be located across flow passage 29 from the gamma ray source 55 as illustrated or it may be located on the same side of passage 29 as the source 55 but spaced therefrom with shielding on the side of the detector away from the passage. As a result of this location, gamma rays reaching the detector means 70 are attenuated by the drilling fluid in passage 29 so that the output signal from the detector is indicative of the density and photoelectric absorption coefficient of the drilling fluid. Detector means 70 preferably comprises a pair of G.M. detectors, one filtered to discriminate against low energy gamma rays and the other being unfiltered. Such an arrangement allows determination of attenuation effects due to both drilling fluid density and to photoelectric adsorption (P.E.).

Knowledge of gamma ray attenuation caused by the drilling fluid is desirable for generating an improved formation gamma density determination better compensated for standoff or cave effects. In making a drilling fluid attenuation correction, the difference between formation density calculated from the far detector 31 and that calculated from the near detector 30 is generated. This difference is functionally related to an increment, which should be added to the density determined from the far detector, and which may be determined from a family of empirically determined curves. Each member of the family is attributable to a drilling fluid having a different gamma ray adsorption property arising from drilling fluid density and photoelectric absorption. Thus, knowledge of the density and the photoelectric adsorption coefficient of the drilling fluid is necessary to make an appropriate correction to the determined formation density.

Another correction to the density determination is frequently in order. As is well known, density is derived from the detection of gamma rays that have been Compton scattered by electrons in the formation. Any source of gamma rays other than those originating in the source 55 of the radioactivity logging means 24 will give misleading results. It is also well known that various geological formations are naturally radioactive (especially shales) and produce natural gamma radiation. This background radiation interferes with the density measurement as discussed above. In recognition of this problem, it is proposed herein to provide means for identifying the natural background portion of the gamma ray signal detected by detectors 30 and 31 and to make corrections based on this identified background.

Before describing this additional correction, a brief description of the detection systems of gamma ray detectors 30 and 3 is in order.

Due to its relative proximity to the gamma ray source 55, near spaced detector 30 is blessed with abundant gamma ray detection count rate. So much so, in fact, that the natural gamma ray background originating from the formation does not cause any substantial background problems. Near detector 30 is therefore equipped with a small cesium 137 mono-energetic calibration source which emits calibration gamma rays at 662 Kev. The detected spectrum may be divided into any number of convenient windows for spectral analysis as is conventional. For example, in the preferred embodiment, the following energy windows are provided: 50-100 Kev, 100-150 Kev, 150-300 Kev, a pair of 60 Kev windows spanning the 662 Kev calibration energy, and a 60 Kev window above the calibration windows for detector resolution determination. As is known from wireline logging techniques, the 40-80 Kev window is useful for determining photoelectric absorption effects which is lithology dependent, and the 150-300 window is useful for determining the density of the formation.

The far gamma ray detector 31 (NaI scintillation crystal coupled to a photomultiplier), on the other hand, is far enough away from source 55 that natural background from the formation is expected to cause a count rate component which is best removed in order to obtain a high quality density determination. For this gamma ray detector a small americium mono-energetic radioactive source is provided adjacent to detector 31 to produce mono-energetic gamma rays at a low, 60 Kev energy for gain stabilization of the far detector. Means for making a spectral analysis of the detected gamma ray signal is provided. Such spectral analysis for the far detector 31 may preferably also provide a plurality of energy windows as follows: a pair of small windows surrounding the 60 window and a 400-800 Kev window whose function will be described below. As is well known, gain stabilization is performed by knowing the energy of the mono-energetic gamma rays originating from the stabilization sources, identifying the corresponding peak on the detected spectrum and adjusting the gain of the detector electronics until the position of the detected peak matches the known energy of the stabilization source.

The stabilization source which is provided with the far detector 31 emits gamma rays having relatively low energies so that one can be assured that no portion of the spectrum above that value is due to the stabilization source. The lower threshold (400 Kev) of the 400-800 Kev window is established with the knowledge that in this window there is little if any contribution attributable to the Compton scattered gamma rays. Consequently, it can be said with substantial certainty that all gamma rays detected as having energies above a threshold of 400 Kev or in the 400-800 Kev window originate from natural formation radioactive decay and comprises undesirable background. Hence, a background signal is determined from the detection of gamma rays having energies above the 400 Kev threshold, while the formation density signal is derived from gamma rays having energies within the 150-300 energy window. The background signal is then used to correct the density signal to substantially eliminate the effects of background on the density signal. For example, an empirically determined factor is multiplied with the background signal and then subtracted from the count rate of the density signal derived from the 150-300 energy window to produce an improved density count rate which is subsequently combined in a known manner with the 150-300 Kev signal derived from the near detector 30 to produce an indication of formation density.

In many instances, the nuclear FEWD logging tool will be included in a drill string having a surveying tool 55 which includes magnetometers and accelerometers for detecting the inclination and azimuth of the drill string. The magnetometers of such surveying tools respond to magnetic fields that may be produced by elements of the drill string made from magnetic material Therefore, in some circumstances, it is desirable to fabricate the drill collar of the logging means 24 out of non-magnetic material. Unfortunately, it has been observed in test logs that certain, commonly used non-magnetic drill collars introduce an additional interference to the measurements made by the gamma ray detectors 60″.

Specifically, neutrons that have been thermalized by the formation may interact with the materials of the non-magnetic drill collar in addition to the activation of the formation, may cause the activation of the drill collar. The activated nuclei of the drill collar, especially the element manganese, decay with a characteristic halflife to produce decay gamma rays. Such activation gamma rays are detected by the gamma ray detectors 60″ and therefore increase the detector's count rate in the manner of undesirable background which, unless compensated for, causes the porosity determination from the gamma ray detectors to be erroneously low. This undesirable background depends on the prior history of exposure of the drill collar to a thermal neutron flux. Despite the constancy of the high energy neutron flux from the chemical source 58, the thermal neutron flux to which the drill collar is exposed is a function of the porosity of the formation and borehole environment since the population of thermal neutrons which cause the activation is dependent on the ability of the formation to thermalize the high energy neutrons produced by the source.

A compensation technique has been developed which corrects the capture gamma ray porosity determination for activation background. In this regard, advantage is taken of the feature of the tool in which both neutron 60′ and gamma ray detectors 60″ are provided at the same distance from the source 58. Specifically, the thermal neutron helium 3 detectors are substantially insensitive to gamma rays so that their output is a record of the precise thermal neutron flux responsible for the magnitude of the activation gamma ray background which interferes with the capture gamma ray porosity determination.

Activation background, which is to be subtracted from the count rate signal measured by detectors 60′, may be determined from the following correction algorithm in which the activation background is a function of the integral of the thermal neutron flux detected by detectors 60′:

$$C^{ACT} = \sum_{L=1}^{N} \lambda_{MN} a e^{b \ln C_i^n} \Delta t e^{-\lambda_{MN}(N-i)\Delta t}$$

where
$C^{ACT}$ = the activation count rate,
$\Delta t$ = the accumulation time interval,
$C_i^n$ = the neutron count rate in time interval i,
$\lambda_{MN}$ = the Mn-56 decay constant, and
a,b = empirically determined constants. While only a single embodiment of the present invention and one mode of practicing the invention have been illustrated and described herein, it is apparent that various changes and modifications may be made without departing from the principles of the present invention in its broader aspect; and, therefore the aim of the appended claims is to cover all such changes and modifications as fall within the true spirit and scope of this invention.

What is claimed is:

1. An apparatus for investigating properties of earth formations surrounding a borehole comprising:
   a. a tubular body adapted to be coupled to a drill string and adapted to permit the flow of drilling fluid therethrough;
   b. a neutron source positioned within said tubular body on its cylindrical axis and adapted to permit the downward flow of drilling fluid therearound for bombarding the formation with high energy neutrons and for producing secondary radiation as a result of neutron-formation interactions;

c. first secondary radiation detector means on the interior of said tubular body at a first spaced location from said neutron source for detecting secondary radiation and for generating a signal indicative thereof;

d. second secondary radiation detector means on the interior of said tubular body at a second spaced location from said neutron source for detecting secondary radiation and for generating a signal indicative thereof; and e. means for combining said signals to generate a signal indicative of porosity.

2. An apparatus for investigating properties of earth formations surrounding a borehole comprising:

a. a tubular body adapted to be coupled to a drill string and adapted to permit the flow of drilling fluid therethrough;

b. a gamma ray source positioned within said tubular body against its interior side and adapted to permit the downward flow of drilling fluid on one side thereof;

c. first gamma ray detecting means positioned at a first spaced location from said gamma ray source against the interior side of said tubular body for detecting gamma rays and for generating a signal indicative thereof, said first gamma ray detecting means comprising a first gamma ray scintillator coupled to a photomultiplier;

d. second gamma ray detecting means positioned at a second spaced location from said gamma ray source against the interior side of said tubular body for detecting gamma rays and for generating a signal indicative thereof, said second gamma ray detecting means comprising a second gamma ray scintillator coupled to a photomultiplier, said first and second gamma ray detecting means being adapted to permit the downward flow of drilling fluid on one side thereof; and e. means for combining said signals for generating a signal indicative of a formation characteristic selected from the group comprising formation density and formation photoelectric absorption coefficient.

3. An apparatus for investigating properties of earth formations surrounding a borehole comprising:

a. a tubular body adapted to be coupled to a drill string and adapted to permit the downward flow of drilling fluid therethrough;

b. a neutron source positioned within said tubular body on its cylindrical axis and adapted to permit the downward flow of drilling fluid therearound for bombarding the formation with high energy neutrons and for producing secondary radiation as a result of neutron-formation interaction;

c. first secondary radiation detector means positioned within said tubular body at a first spaced location from said neutron source for detecting secondary radiation and for generating a first signal indicative thereof;

d. second secondary radiation detector means positioned within said tubular body at a second spaced location from said neutron source for detecting secondary radiation and for generating a second signal indicative thereof;

e. a gamma ray source positioned against the interior side of said tubular body at an axial position different from the position of said neutron source and permitting the downward flow of drilling fluid on one side thereof through the interior of said tubular body;

f. first gamma ray detecting means positioned at a first spaced location from said gamma ray source against the interior side of said tubular body for detecting gamma rays and for generating a third signal indicative thereof, said first gamma ray detecting means comprising a first gamma ray scintillator coupled to a photomultiplier;

g. second gamma ray detecting means positioned at a second spaced location from said gamma ray source against the interior side of said tubular body for detecting gamma rays and for generating a fourth signal indicative thereof, said second gamma ray detecting means comprising a second gamma ray scintillator coupled to a photomultiplier, said first and second gamma ray detecting means being adapted to permit the downward flow of drilling fluid on one side thereof through the interior of said tubular body; and h. means for combining said first and second signals and said third and fourth signals to respectively generate signals indicative of formation porosity and a formation characteristic selected from the group comprising formation density and formation photoelectric absorption coefficient.

4. The apparatus as recited in claims 1, 2 or 3 wherein all sources are adapted to be removed from said tubular body along its interior.

5. The apparatus as recited in claims 1 or 3 wherein each of said secondary radiation detector means comprises a plurality of detectors arranged in a circular array on the interior of said tubular housing with its cylindrical axis colinear with the cylindrical axis of said tubular body and being adapted to permit the flow of drilling fluid through the array.

6. The apparatus as recited in claims 1 or 3 wherein said secondary radiation detector means comprises at least two different types of detectors having different detection characteristics.

7. The apparatus as recited in claim 6 wherein said secondary detector means comprise detectors selected from the group comprising a thermal neutron detector, an epithermal neutron detector, a gamma ray scintillation detector and a Geiger-Muller gamma ray detector.

8. The apparatus as recited in claims 2, or 3 wherein said gamma ray detecting means includes an inorganic scintillator coupled to a photomultiplier.

9. The apparatus as recited in claims 2 or 3 wherein said tubular body is provided with gamma ray transparent windows adjacent to said gamma ray source and to said gamma ray detecting means.

10. The apparatus as recited in claims 2 or 3 further including a fluid excluder fixed to the exterior of said tubular body adjacent to the positions of said gamma ray source and said gamma ray detecting means.

11. The apparatus as recited in claim 10 wherein said fluid excluder is provided with gamma ray transparent windows adjacent to said gamma ray source and to said gamma ray detecting means.

12. The apparatus as recited in claims 2 or 3 further including a gamma ray detecting means positioned within said tubular body for detecting gamma rays after they have traversed the interior of said tubular body.

13. The apparatus as recited in claim 3 further including means for physically connecting said gamma ray source and said neutron source.

14. The apparatus as recited in claim 12 wherein said gamma ray detecting means includes means for determining the photoelectric absorption coefficient and the density of drilling fluid flowing through the interior of said tubular body.

15. The apparatus as recited in claim 2 or 3 further including means for detecting background and for making background corrections to said signals indicative of gamma rays.

16. The apparatus as recited in claim 15 wherein said means for detecting background includes means coupled to the gamma ray detecting means spaced farthest from said gamma ray source for comparing the energy of detected gamma rays to an energy threshold and means for counting as background only those gamma rays whose energy exceeds said threshold.

17. The apparatus as recited in claim 16 wherein said gamma ray detecting means spaced farthest from said gamma ray source further includes a means for stabilizing said gamma ray detecting means, said stabilizing means including a gamma ray source which emits gamma rays having an energy less than said threshold.

18. The apparatus as recited in claim 16 wherein said means for making background corrections to said signals indicative of gamma rays includes means for correcting said signals indicative of gamma rays in proportion to said signal derived from gamma rays having energies greater than said threshold.

19. The apparatus as recited in claim 16 wherein said threshold is in the range of 350–400 Kev.

20. The apparatus as recited in claims 2 or 3 further including means responsive to the gamma ray detecting means spaced closest to said gamma ray source for deriving a gamma ray energy spectrum from which a photoelectric absorption coefficient may be derived.

21. The apparatus as recited in claim 20 wherein said gamma ray detecting means spaced closest to said gamma ray source includes a mono-energetic stabilization source which produces gamma rays in an energy range above 300 Kev.

22. The apparatus as recited in claims 1 or 3 further including microphonic noise detection means for detecting the occurrence of microphonic noise in said secondary radiation detector means.

23. The apparatus as recited in claim 22 wherein said microphonic noise detection means includes an accelerometer for detecting the occurrence of accelerations greater than a predetermined threshold, which accelerations produce microphonic noise in said secondary radiation detector means.

24. The apparatus as recited in claim 22 wherein said microphonic noise detection means includes a helium 3 detector located in said apparatus such that substantially no neutrons from said source are detected by said helium 3 detector.

25. The apparatus as recited in claim 22 wherein said microphonic noise detection means includes a helium 3 detector which is not connected to its usual high voltage power source.

26. The apparatus as recited in claim 22 further including means responsive to said microphonic noise detection means and to said secondary radiation detector means for discarding the signals from said secondary radiation detector means whenever microphonic noise is detected.

27. The apparatus as recited in claim 5 further including a means positioned on the inside of said circular array for shielding said array from thermal neutrons originating in the drilling fluid passing through the interior of said tubular body.

28. The apparatus as recited in claim 6 further including means for combining the signals from said two different detectors to generate a signal indicative of chlorine.

29. The apparatus as recited in claim 7 wherein said secondary radiation detector means include a helium three detector with its central conductor connected to ground and its periphery connected to a high negative voltage, and further including high voltage electrical insulation surrounding said helium 3 detector.

30. A method of investigating characteristics of earth formations surrounding a borehole by means of an instrument coupled to the drill string, including the steps of:
   a. irradiating the formations with neutrons from a source positioned in said borehole;
   b. detecting neutrons returning to the borehole from said formations and generating signals indicative thereof;
   c. detecting capture gamma rays returning to the borehole from said formations and generating signals indicative thereof; and
   d. in response to said signals, generating a signal indicative of chlorine.

31. An apparatus for investigating properties of earth formations surrounding a borehole comprising:
   a. a tubular body adapted to be coupled to a drill string and adapted to permit the flow of drilling fluid therethrough;
   b. a neutron source carried by said tubular body for bombarding the formation with high energy neutrons and for producing secondary radiation as a result of neutron-formation interactions;
   c. detector means carried by said tubular body at a spaced location from said neutron source for detecting secondary radiation and for generating a signal indicative thereof, said detector means comprising at least two different types of secondary radiation detectors having different detection characteristics; and
   d. means responsive to said signal indicative of secondary radiation for generating a signal indicative of porosity.

32. A method of investigating characteristics of earth formations surrounding a borehole by means of an instrument coupled to the drill string, including the steps of:
   a. irradiating the formations with gamma rays from a source positioned in said borehole;
   b. detecting gamma rays returning to the borehole from said formations at first and second locations spaced from said source;
   c. detecting gamma rays passing through material in said borehole and generating signals indicative of density and photoelectric absorption coefficient therefrom; and
   d. in response to said signals, generating a signal indicative of the density and photoelectric absorption coefficient of said formation corrected for the effects of density and photoelectric absorption of the materials in the borehole.

33. An apparatus for investigating properties of earth formations surrounding a borehole comprising:

a. a tubular body adapted to be coupled to a drill string and adapted to permit the flow of drilling fluid therethrough;
b. a gamma ray source carried by said tubular body;
c. a gamma ray detector positioned within said tubular body for detecting gamma rays after they have traversed the interior of said tubular body and for generating signals indicative of the density and photoelectric absorption of the drilling fluid; and
d. means responsive to said signals for generating a signal indicative of a formation characteristic selected from the group comprising formation density and formation photoelectric absorption coefficient.

34. An apparatus for investigating properties of earth formations surrounding a borehole comprising:
a. a tubular body adapted to be coupled to a drill string and adapted to permit the flow of drilling fluid therethrough;
b. a gamma ray source carried by said tubular body;
c. detector means positioned at a spaced location from said gamma ray source for detecting gamma rays and for generating a signal indicative thereof, said detector means comprising a gamma ray scintillator coupled to a photomultiplier;
d. means for detecting gamma ray background and for making background corrections to said signals indicative of gamma rays;
e. means responsive to said signals for generating a signal indicative of formation density.

35. The apparatus as recited in claim 34 wherein said means for detecting background includes means responsive to said detector detecting means for comparing the energy of detected gamma rays to an energy threshold and means for counting as background only those gamma rays whose energy exceeds said energy threshold.

36. The apparatus as recited in claim 34 further including means for stabilizing said detector means, said stabilizing means including a gamma ray source which emits gamma rays having an energy less than said energy threshold.

37. The apparatus as recited in claim 35 wherein said means for making background corrections to said signals indicative of gamma rays includes means for correcting said signal indicative of gamma rays in proportion to said signal derived from gamma rays having energies greater than said threshold.

38. The apparatus as recited in claim 34 wherein said energy threshold is in the range of 350–400 kilovolts.

39. An apparatus for investigating properties of earth formations surrounding a borehole comprising:
a. a tubular body adapted to be coupled to a drill string and adapted to permit the flow of drilling fluid therethrough;
b. a neutron source carried by said tubular body for bombarding the formation with high energy neutrons and for producing secondary radiation as a result of neutron-formation interactions;
c. secondary radiation detecting means carried by said tubular body for detecting secondary radiation and for generating a signal indicative thereof;
d. means responsive to said signal indicative of secondary radiation for generating a signal indicative of secondary radiation substantially free of the effects of microphonic noise produced by said secondary radiation detecting means.

40. The apparatus as recited in claim 39 including microphonic noise detection means for detecting microphonic noise.

41. The apparatus as recited in claim 40 including an accelerometer for detecting the occurrence of accelerations greater than a predetermined threshold, which accelerations produce microphonic noise in said secondary radiation detecting means.

42. The apparatus as recited in claim 40 wherein said microphonic noise detection means includes a helium 3 detector located in said apparatus such that substantially no neutrons from said source are detected by said helium 3 detector.

43. The apparatus as recited in claim 40 wherein said microphonic noise detection means includes a helium 3 detector which is not connected to its usual high voltage power source.

44. The apparatus as recited in claim 40 further including means responsive to said microphonic noise detection means and to said secondary radiation detecting means for discarding the signals from said secondary radiation detecting means whenever microphonic noise is detected.

45. A method of investigating characteristics of earth formations surrounding a borehole by means of an instrument adapted to be moved through said borehole, including the steps of:
a. irradiating the formations with neutrons from a source positioned in said borehole;
b. detecting thermal neutrons returning to the borehole from said formations and generating a signal indicative of thermal neutrons;
c. detecting gamma rays in the borehole originating from interactions between said neutrons and elemental nuclei and generating a signal indicative of gamma rays, at least a fraction of said detected gamma rays originating from the activation of the instrument; and
d. generating a signal indicative of formation porosity from said signal indicative of gamma corrected for activation background by said thermal neutron signal.

46. The method as recited in claim 45 further comprising the step of integrating said signal indicative of thermal neutrons with respect to time.

* * * * *